(12) United States Patent
Fugger et al.

(10) Patent No.: US 6,868,432 B2
(45) Date of Patent: Mar. 15, 2005

(54) ADDITION CIRCUIT FOR DIGITAL DATA WITH A DELAYED SATURATION OPERATION FOR THE MOST SIGNIFICANT DATA BITS

(75) Inventors: Paul Fugger, Graz (AT); Filip Netrval, Linkoeping (SE)

(73) Assignee: Infineon Technologies AG, Munich (DE)

( * ) Notice: Subject to any disclaimer, the term of this patent is extended or adjusted under 35 U.S.C. 154(b) by 508 days.

(21) Appl. No.: 09/935,791

(22) Filed: Aug. 22, 2001

(65) Prior Publication Data

US 2002/0075975 A1 Jun. 20, 2002

(30) Foreign Application Priority Data

Aug. 24, 2000 (DE) .......................................... 100 41 511

(51) Int. Cl.[7] .................................................. G06F 7/50
(52) U.S. Cl. ...................................................... 708/670
(58) Field of Search ................................ 708/670, 505, 708/207, 552; 340/146.2

(56) References Cited

U.S. PATENT DOCUMENTS

| | | | | |
|---|---|---|---|---|
| 4,382,179 A | * | 5/1983 | Penton ......................... | 377/20 |
| 4,760,374 A | * | 7/1988 | Moller ..................... | 340/146.2 |
| 4,970,676 A | | 11/1990 | Fling ........................... | 364/759 |
| 5,010,509 A | * | 4/1991 | Cox et al. ................... | 708/511 |
| 5,847,978 A | * | 12/1998 | Ogura et al. ................ | 708/552 |
| 6,519,620 B1 | * | 2/2003 | Nguyen et al. ............. | 708/552 |

FOREIGN PATENT DOCUMENTS

EP    0766169 A1    4/1997   ............. G06F/7/48

OTHER PUBLICATIONS

Monteiro et al., "Retiming sequential cicuits for low power", *IEEE. Comp. Soc. Press, US*, pp. 398–402. (1993).
Piguet, C., "Low–Power and Low–Voltage CMOS Digital Design", *Elsevier Science B.V.*, pp. 179–208, (1997).
Alidina et al., "Precomputation–based Sequential Logic Optimization for Low Power", *IEEE/ACM International Conference on Computer–Aided Design.* pp. 74–81 (1994).
Chandrakasan A. P. et al., "Minimizing Power Consumption in Digital CMOS Circuits", *Proceedings of the IEEE*, pp. 498–523 (1995).

* cited by examiner

*Primary Examiner*—Tan V. Mai
(74) *Attorney, Agent, or Firm*—Fish & Richardson P.C.

(57) ABSTRACT

An addition circuit for digital data includes a digital adder for the addition of digital input data values present at data inputs of the digital adder to form a summation output data value, at an output of the digital adder. The data inputs have a predetermined data bit width n. A saturation circuit for limits the summation output data value present at a data input of the saturation circuit to be within a range determined by an upper threshold data value and a lower threshold data value. The n–m least significant data bits of the summation output data value are present directly at the data input of the saturation circuit, whereas the m most significant data bits of the summation output data value are switched through to the data input of the saturation circuit via a clock-state-controlled latch register.

7 Claims, 5 Drawing Sheets

ADDITION CIRCUIT FOR DIGITAL DATA WITH A DELAYED SATURATION OPERATION FOR THE MOST SIGNIFICANT DATA BITS

FIELD OF INVENTION

The invention relates to a power-saving addition circuit for digital data with a saturation circuit for limiting the output data value range delivered by the addition circuit.

BACKGROUND

DE 40 10 735 C 2 discloses a digital word-serial multiplying circuit. This serves for generating products of two bit-parallel binary signal values, which respectively contain bits of ascending order of significance, including a least significant bit and a most significant bit.

FIG. 1 shows an addition circuit for digital data with a saturation circuit. The addition circuit serves for the digital addition of two digital data values A, B. The data values A, B are in each case written to a clocked input register and have a predetermined data bit width n. The input registers A, B serve for the buffer storage of the input data A, B to be added and are respectively connected via n data lines to a data input of a digital adder ADD. The digital adder ADD is based on n full adders and has an n-bit-wide summation output to deliver the summation output data value formed by addition to a saturation circuit SAT. The saturation circuit SAT limits the present summation output data value within a data value range which is determined by an upper and a lower digital threshold value $S_{min}$, $S_{max}$. This achieves a clipping of the digital output signal. The summation output data value limited by the saturation circuit SAT is buffer-stored in a clocked output register and delivered for further data processing. The two input registers A, B and the output register are clocked by a clock signal CLK via a common clock line.

FIG. 2 shows timing diagrams of the signals within the conventional addition circuit, as it is represented in FIG. 1.

The conventional addition circuit receives the clock signal CLK with a predetermined clock period $T_{clk}$ via a clock signal circuit. With the rising edge at the time $t_0$, a data change takes place in the input data registers A, B, which are summed in the adder ADD. After a signal transit time, the summation output data value occurs at the output of the adder ADD as from the time $t_2$. At the same time, a "glitching" takes place at the output of the adder ADD, i.e. the output data value fluctuates or changes until the final summation output data value has established itself. Glitches are disruptive pulses of short duration. The saturation circuit SAT receives the digital output signal, affected by disruptive pulses, from the adder ADD and delivers the unstable data to the output register between the times $t_3$ and $t_5$. The limited summation output data value fluctuates back and forth ("toggling") during the time $\Delta T$ between the upper threshold value, the lower threshold value and the summation output value of the digital adder. Switching over between the upper threshold value and the minimum threshold value causes the data delivered by the saturation circuit SAT to have undergone a very high number of switching operations, resulting in a very high power loss in the saturation circuit SAT.

SUMMARY

It is therefore the object of the present invention to provide an addition circuit for digital data with a saturation circuit in which the power loss caused by switching operations within the saturation circuit is minimal.

The invention provides an addition circuit for digital data with a digital adder for the addition of digital input data values which are present at data inputs of the digital adder to form a summation output data value, which is output at an output of the digital adder, the data inputs having a predetermined data bit width n, a saturation circuit for limiting the summation output data value present at a data input of the saturation circuit within a data value range which is determined by an upper threshold value and a lower threshold value, the n–m least significant data bits.

The addition circuit preferably has input registers for buffer-storing the digital input data values.

The addition circuit preferably has, in addition, an output register for buffer-storing the summation output data value limited by the saturation circuit.

In a preferred embodiment of the addition circuit according to the invention, the input registers and the output register are connected to a clock signal line for applying a clock signal CLK.

The clock-state-controlled latch register preferably has a control input, which is connected to the clock signal line via an inverter circuit.

The upper and lower threshold data values are preferably settable.

In a particularly preferred embodiment of the addition circuit according to the invention, the saturation circuit has a first comparator for comparing the present summation output data value with the upper threshold data value and a second comparator for comparing the present summation output data value with the lower threshold data value.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
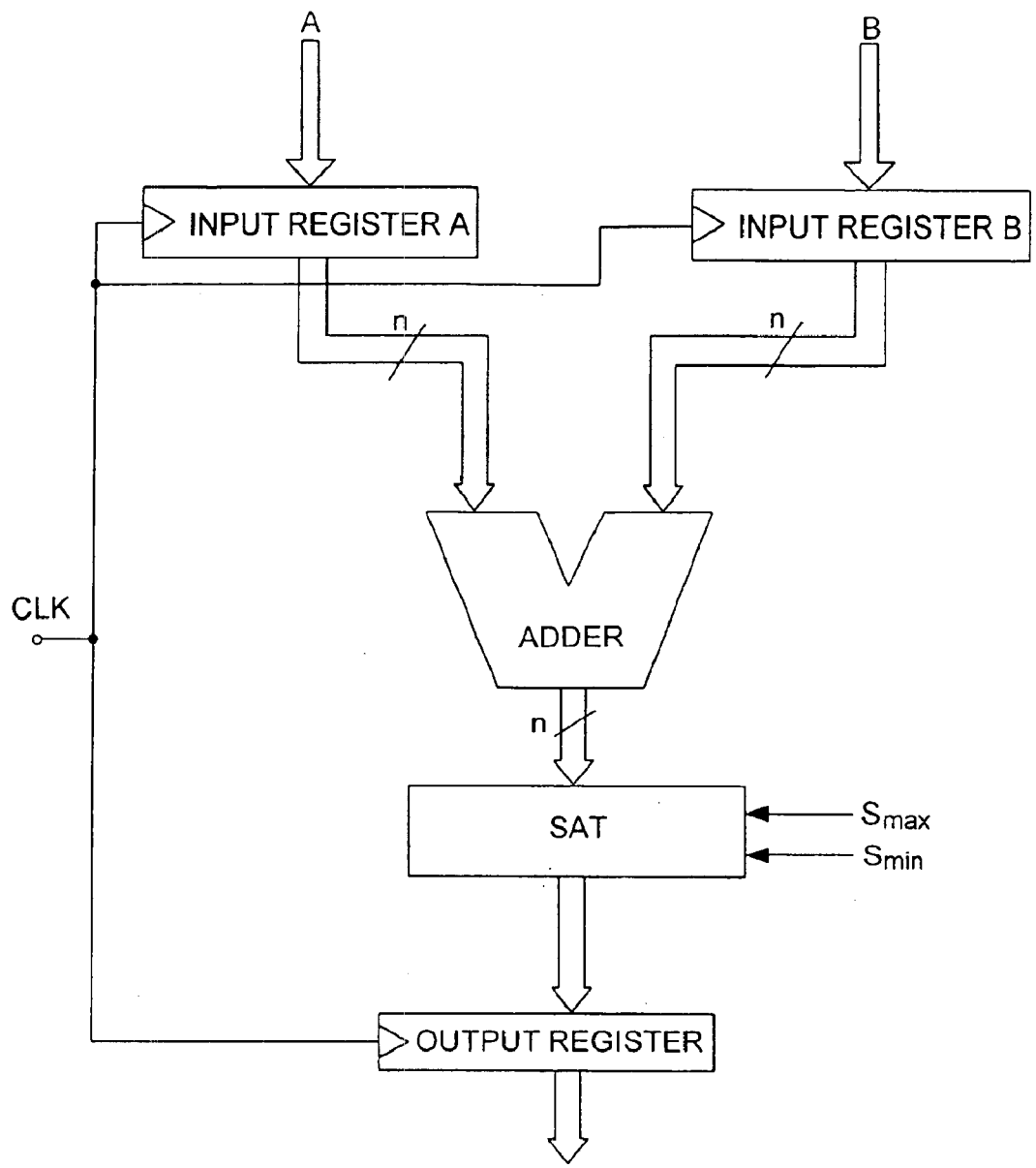
FIG. 1 shows an addition circuit for digital data.
Figure 2:
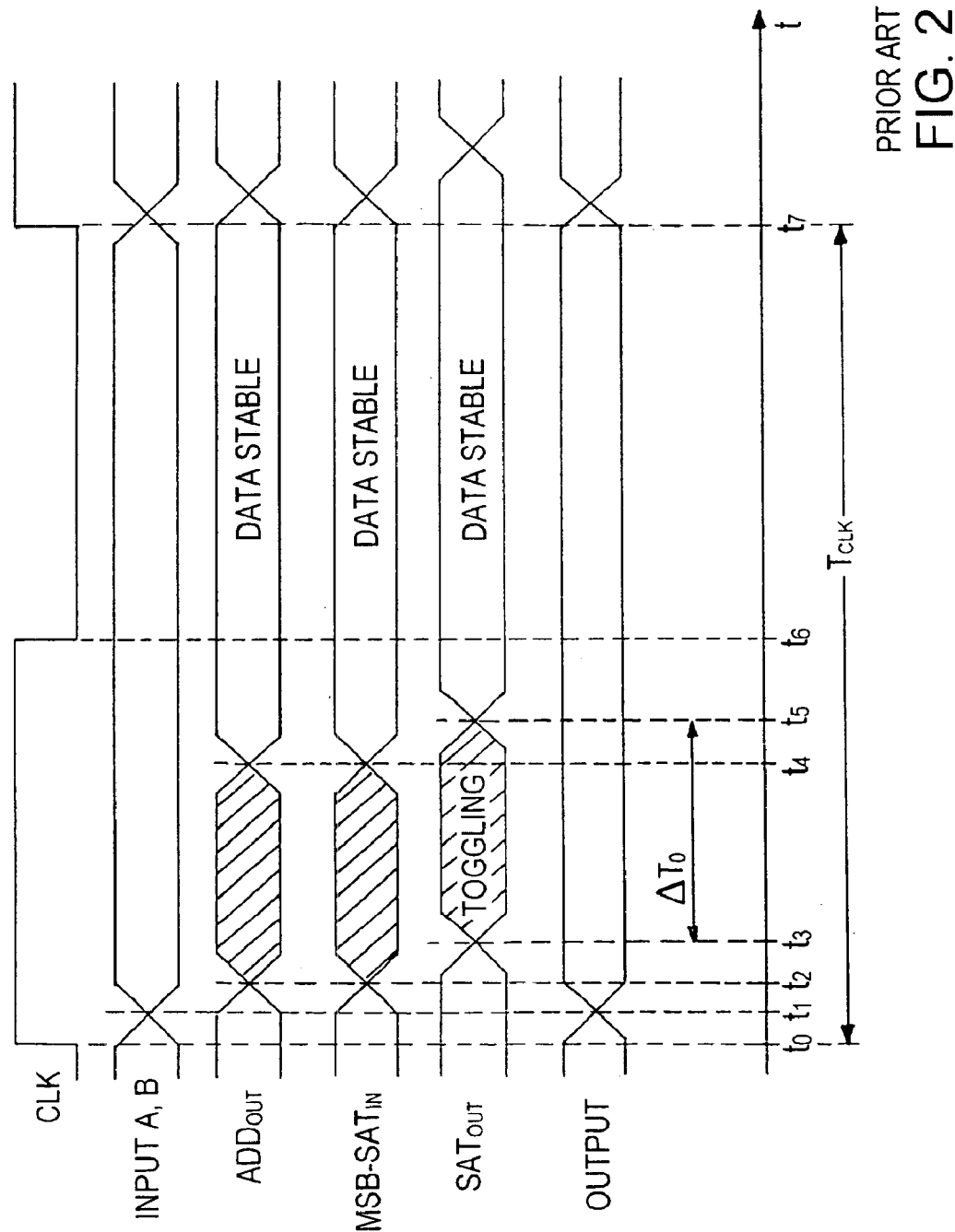
FIG. 2 shows timing diagrams for representing the signals occurring within a conventional addition circuit.
Figure 3:
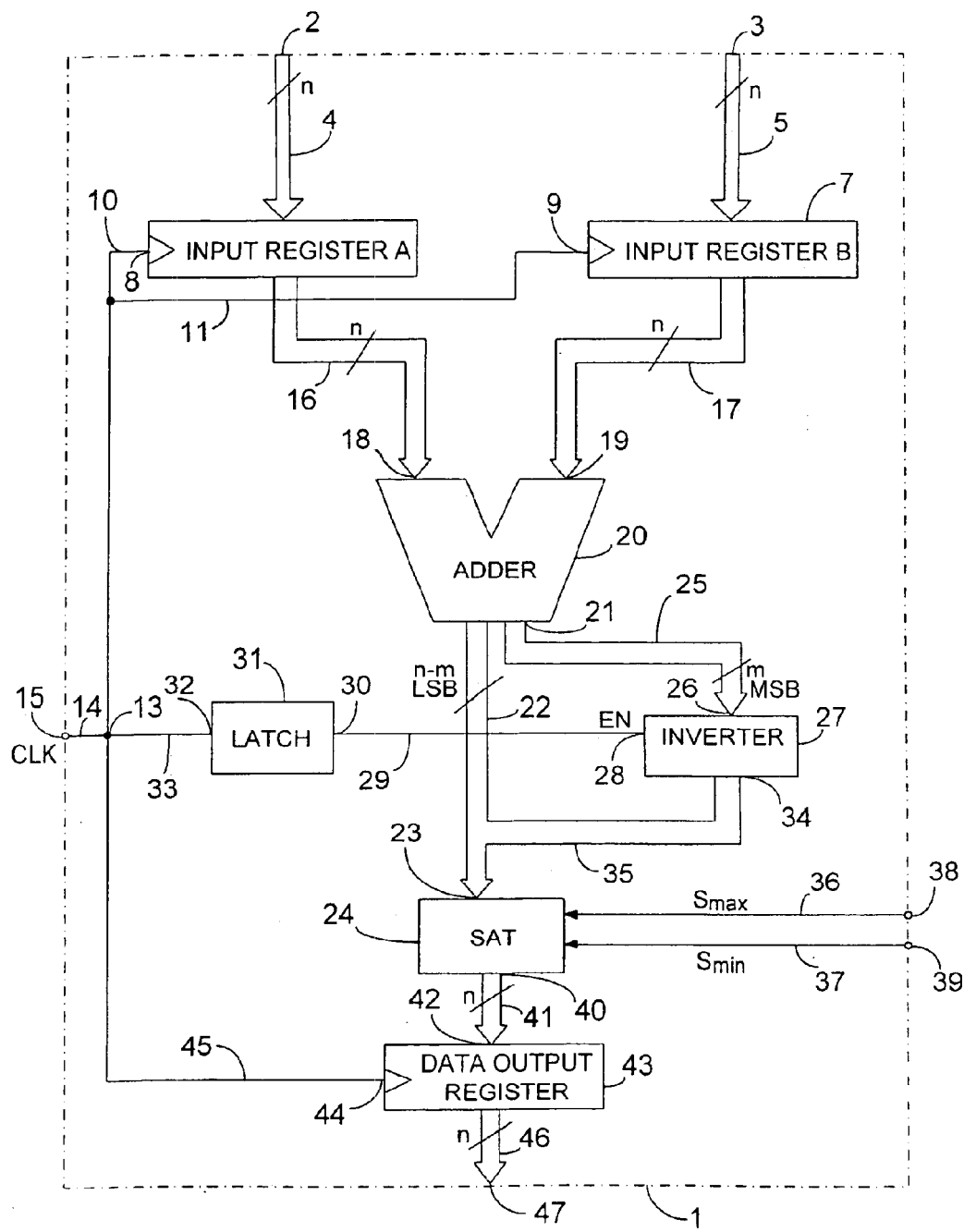
FIG. 3 shows a block diagram of a preferred embodiment of the addition circuit according to the invention for digital data.

As FIG. 3 reveals, the addition circuit 1 according to the invention has a first data input 2 and a second data input 3 for applying digital input data values. The present input data values are written to input registers 6, 7, n bits wide in each case, via n parallel data lines 4, 5 for buffer storage. The input registers 6, 7 have in each case a clock signal input 8, 9. The clock signal inputs 8, 9 of the two input registers 6, 7 are connected via clock lines 10, 11, 12 to a clock-signal branching node 13 of the addition circuit 1. The clock-signal branching node 13 is connected via an internal clock line 14 to a clock-signal input 15 of the addition circuit 1. The data outputs of the input registers 6, 7 are connected via n parallel data lines 16, 17 to data inputs 18, 19 of a digital adder 20. The digital adder 20 is preferably composed of full-adder components. The digital adder 20 adds the two digital input data values present at the digital data inputs 18, 19 and delivers a summation output data value via a data output 21.

The n−m least significant data bits of the summation output data value formed are applied via n−m parallel data bit lines 22 directly to a data input 23 of a downstream saturation circuit 24.

The m most-significant data bits of the summation output data value formed are applied via m parallel data bit line 25 to a data input 26 of a clock-state-controlled latch register 27. The clock-state-controlled latch register 27 has a control input 28, which is connected via a control line 29 to an output 30 of an inverter circuit 31. The inverter circuit 31 has an input 32, which is connected via a signal line 33 to the clock-signal branching node 13. The inverter circuit 31 inverts the clock signal CLK present at its input 32 and delivers it as control signal EN to the control input 28 of the clock-state-controlled latch register 27. The clock-state-controlled latch register 27 has a data output 34, which is connected via m data bit lines 35 to the data input 23 of the downstream saturation circuit 24.

The saturation circuit 24 serves for limiting the summation output data value present at the data input 23 within a data value range which is determined by an upper threshold data value $S_{max}$ and a lower threshold data value $S_{min}$. In a preferred embodiment, the upper and lower threshold data values $S_{max}$, $S_{min}$ can be set via setting lines 36, 37 and setting connections 38, 39 of the addition circuit 1. The saturation circuit 24 has a data output 40, which is connected via n parallel data bit lines 41 to an input 42 of the data output register 43 of the addition circuit 1. The data output register 43 has a clock input 44, which is connected via a clock-signal line 45 to the clock-signal branching node 13. The output register 43 buffer-stores the summation output data value limited by the saturation circuit 24 and delivers it via n parallel-connected data bit lines 46 to a data output 47 of the addition circuit 1.

Figure 4:
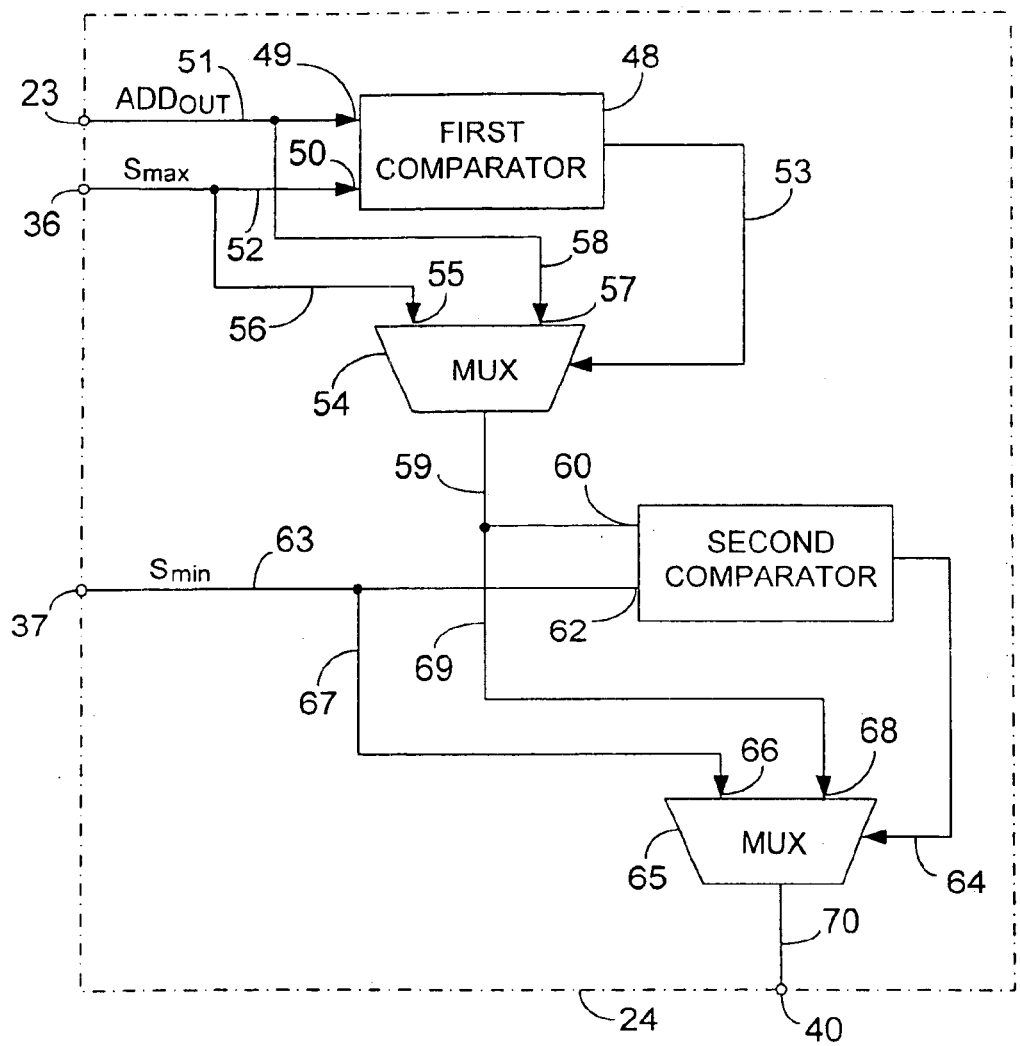
FIG. 4 shows a preferred embodiment of the saturation circuit contained in the addition circuit according to the invention.

FIG. 4 shows a preferred embodiment of the saturation circuit 24 contained in the addition circuit 1. The saturation circuit 24 contains a first comparator 48 for comparing the summation output data value present at the data input 23 with the upper threshold data value $S_{max}$ present on the setting line 36. For this purpose, the first comparator 48 has a first input 49 and a second input 50 for receiving the summation output data value output by the adder 20 via a line 51 and for receiving the upper threshold data value $S_{max}$ via a line 52. The first comparator 48 controls, via a control line 53, a multiplexer 54, which receives the upper data threshold value $S_{max}$ via a first data input 55 and a data line 56 and receives the summation output data value $ADD_{out}$ via a second data input 57 and a data line 58.

The output value of the first multiplexer 54 is applied via a data line 59 to a first signal input 60 of a second comparator 61 of the saturation circuit. The second comparator 61 has a second signal input 62, which receives the present settable lower threshold data value $S_{min}$ via a line 63. The second comparator 61 controls via a control line 64 a second multiplexer 65, which receives the lower threshold data value $S_{min}$ via a first signal input 66 and a line 67. The multiplexer 65 has a second input 68, at which the data value delivered by the first multiplexer 54 is present via a line 69. The second multiplexer 65 is connected on the output side via a line 70 to the output 40 of the saturation circuit 24.

If the comparator 48 detects that the summation output data value $ADD_{put}$ generated by the adder 20 is greater than the set upper threshold data value $S_{max}$, the comparator 48 is driven via the control line 33 in the first multiplexer 54 in such a way that the first data output 55 is switched through to the output lines 59. If, in the converse case, the first comparator 48 detects that the summation output data output value $ADD_{out}$ is less than the upper threshold value $S_{max}$, the multiplexer 54 is driven via the control line 33 in such a way that the second data input 57, and consequently the present summation output data value, are switched through to the lines 59.

The second comparator 61 compares the data value present on the data lines 59 with the lower threshold data value $S_{min}$ and drives the second multiplexer 65 correspondingly via the control line 64. If the data value present on the lines 59 is less than the minimum threshold value $S_{min}$, the data input 66 of the second comparator 65 is switched through to the data output 40 of the saturation circuit 24. If the intermediate data value present on the lines 59 is greater than the minimum threshold data value $S_{min}$, the second input 68 of the second multiplexer 65 is switched through to the data output 40 of the saturation circuit 24.

In the preferred embodiment shown in FIG. 4, the saturation circuit 24 is realized by two comparator circuits 48, 61 and two multiplexer circuits 54, 65.

The two threshold data values $S_{min}$, $S_{max}$ are preferably chosen as follows:

$$S_{max}=2^{(n-1)}-1$$

$$S_{min}=-[2^{(n-1)}]$$

The upper threshold value Smut includes at least one zero as most significant data bits MSB and n−1 ones as least significant data bits. Therefore, $S_{max}$ is:

$$S_{max}=2^{(n-1)}-1$$

The lower threshold value $S_{min}$ includes a series of 1 ones as most significant data bits MSB and n−1 zeros as least significant data bits LSB.

The lower threshold data value $S_{min}$ is consequently:

$$S_{min}=-[2^{(n-1)}]$$

Figure 5:
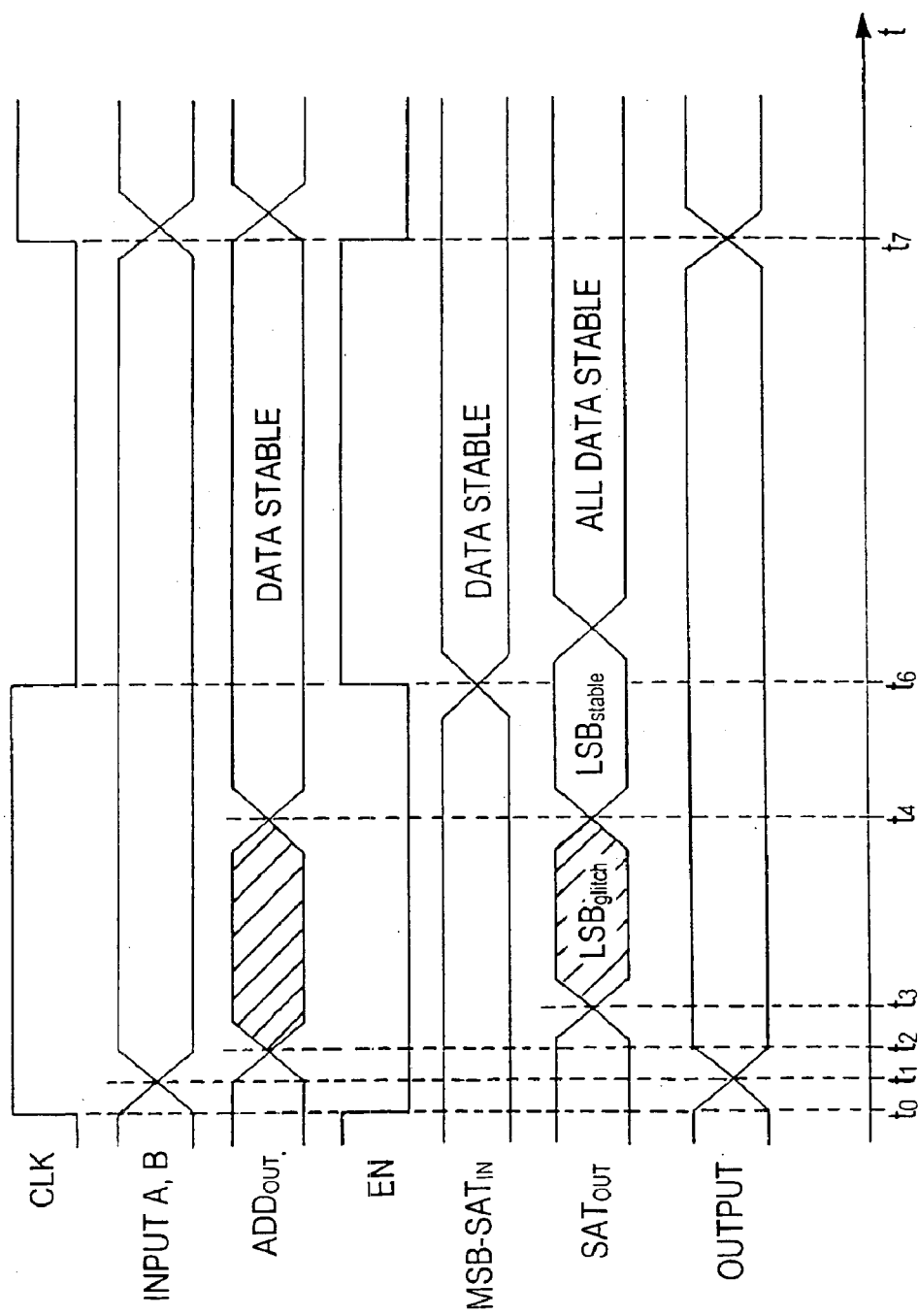
FIG. 5 shows timing diagrams of the signals occurring in the addition circuit according to the invention.

FIG. 5 shows timing diagrams of the signals which occur within the addition circuit 1 according to the invention, as it is represented in FIG. 3. At the clock-signal input 15 there is a common clock signal CLK for the addition circuit 1. At the time $t_0$, the input data values lying in the input data registers 6, 7 are switched through by the rising clock edge of the clock signal CLK after a specific signal transit time with respect to the time $t_1$ to the data inputs 18, 19 of the digital adder 20. As from the time $t_2$, the digital output signal occurs at the output 21 of the digital adder 20. The output data value establishing itself at the output 21 fluctuates or toggles until the time $t_4$.

The clock signal CLK inverted by the inverter circuit 31 is present at the control input 28 of the latch circuit 29 as enabling signal EN (enable). Between the times $t_0$ and $t_6$, no most significant data bits MSB are switched through to the saturation circuit 24 by the latch circuit 27. Between the times $t_2$ and $t_4$, the data bits fluctuate back and forth at the output 21 of the digital adder 20.

Between the times $t_3$ and $t_4$, glitching of the least significant data bits LSB occurs at the output 40 of the saturation circuit 24. Since the most significant data bits MSB-SAT$_{out}$ are stable at the input 23 of the saturation circuit 24, fluctuation back and forth between the maximum threshold value $S_{max}$ and the minimum threshold value $S_{min}$ (toggling) is avoided, with the result that the number of bit switching operations occurring is minimized. The switching power loss within the saturation circuit 24 is minimized in the case of the addition circuit 1 according to the invention by the latch register 27 for the most significant data bits MSB.

In order that the toggling or fluctuation back and forth at the output 40 of the saturation circuit 24 is avoided to the greatest extent, the number m of latched most significant data bits MSB is preferably chosen such that:

$$m > 1$$

Although the switching power loss within the saturation circuit 24 falls with increasing values for m, the switching power loss due to the switching operations within the latch register 27 increases. The minimum switching power loss within the addition circuit 1 is achieved for:

$$m = 1 + 2$$

The data bit width n of the input data to be added is typically in excess of 20 data bits. Dependent on the chosen threshold values $S_{min}$, $S_{max}$, a value of 4 or 5 data bits is preferably chosen for m.

What is claimed is:

1. An addition circuit for digital data with delayed saturation operation for the most significant digital bits, the circuit comprising:

a digital adder for the addition of digital input data values which are present at data inputs of the digital adder to form a summation output data value, which is output at an output of the digital adder, the data inputs having a predetermined data bit width n, and a saturation circuit for limiting the summation output data value present at a data input of the saturation circuit within a data value range which is determined by an upper threshold data value and a lower threshold data value, the n–m least significant data bits of the summation output data value being present directly with a clock signal at the data input of the saturation circuit and the m most significant data bits of the summation output data value being switched through only with an inverted clock signal proceeding the clock signal at the data input of the saturation circuit a clock-state-controlled latch register.

2. The addition circuit as claimed in claim 1, wherein input registers are provided for buffer-storing the digital input data values.

3. The addition circuit as claimed in claim 1, wherein an output register is provided for buffer-storing the summation output data value limited by the saturation circuit.

4. The addition circuit as claimed in claim 3, wherein the input registers and the output register are connected to a clock line for applying the clock signal.

5. The addition circuit as claimed in claim 1, wherein the clock-state-controlled latch register has a control input, which is connected to the clock signal line via an inverter circuit.

6. The addition circuit as claimed in claim 1, wherein the two threshold data values are settable.

7. The addition circuit as claimed in claim 1, wherein the saturation circuit has a first comparator for comparing the present summation output data value with the upper threshold data value and a second comparator for comparing the present summation output data value with the lower threshold data value.

* * * * *